United States Patent [19]
Greer

[11] Patent Number: 4,993,316
[45] Date of Patent: Feb. 19, 1991

[54] SEED GRAIN CONDITIONING APPARATUS

[75] Inventor: David G. Greer, Anoka, Minn.

[73] Assignee: Agrichem, Inc., Anoka, Minn.

[21] Appl. No.: 461,305

[22] Filed: Jan. 5, 1990

Related U.S. Application Data

[63] Continuation-in-part of Ser. No. 191,378, May 9, 1988, Pat. No. 4,898,092.

[51] Int. Cl.$^5$ ............................................. A23N 17/00
[52] U.S. Cl. ...................................... 99/487; 99/516; 99/536
[58] Field of Search ................................. 99/485–487, 99/489, 516, 536, 468, 473, 483; 134/132; 364/502, 468, 469, 473, 148, 173; 366/76, 156, 168, 172; 137/2; 131/301–304

[56] References Cited

U.S. PATENT DOCUMENTS

| | | |
|---|---|---|
| 3,148,971 | 9/1964 | MacDonald et al. |
| 3,255,975 | 6/1966 | Malin et al. |
| 3,703,861 | 11/1972 | Slack et al. ........................... 99/471 |
| 3,717,086 | 2/1973 | Hough ................................... 99/471 |
| 3,932,736 | 1/1976 | Zarow et al. ......................... 99/487 |
| 4,055,673 | 10/1977 | Mueller. |
| 4,064,275 | 12/1977 | Anthony. |
| 4,499,111 | 2/1985 | Oetiker et al. |
| 4,721,448 | 1/1988 | Irish et al. .............................. 99/517 |
| 4,742,463 | 5/1988 | Volk, Jr. ............................... 364/468 |

FOREIGN PATENT DOCUMENTS

| | | |
|---|---|---|
| 2065492 | 3/1970 | Fed. Rep. of Germany. |
| 2055059 | 2/1981 | United Kingdom. |
| WO87/06434 | 11/1987 | World Int. Prop. O. |

OTHER PUBLICATIONS

Boonton Polytechnic Company brochure entitled The Boonton Milltrol System, date unknown.
Dickey-john brochure entitled Continuous Flow Moisture Monitors, date unknown.
Process Automation Systems brochure, date unknown.
Instruction manual for Dickey-John continuous flow moisture monitor, date unknown.

Primary Examiner—Timothy F. Simone
Attorney, Agent, or Firm—Burd, Bartz & Gutenkauf

[57] ABSTRACT

An apparatus for automatically increasing the moisture content of seed grain up to a target moisture content preparatory to planting in order to promote early germination of the seed grain. The apparatus includes a hopper for holding untreated seed grain, a grain conveying means for transfer of the grain from the hopper past a moisture sensing station, a seed grain wetting station, a mixing area, and a discharge chute for discharge of treated seed grain. The moisturizing medium can be water alone or water mixed with other suitable ingredients such as nutrients or a surfactant. At the moisture sensing station, the moisture of the untreated seed grain is continuously monitored. A calibrated moisture sensor generates an electronic signal proportionate to the moisture content of the seed grain. This signal is used to control the application rate of the wetting mixture. The rate can be controlled by varying the speed with which the seed grain passes the wetting station, or by varying the amount of moisture applied to seed grain passing at a constant rate, or a combination of the two. The seed grain is thoroughly mixed with the applied moisture prior to discharge through the discharge chute.

23 Claims, 1 Drawing Sheet

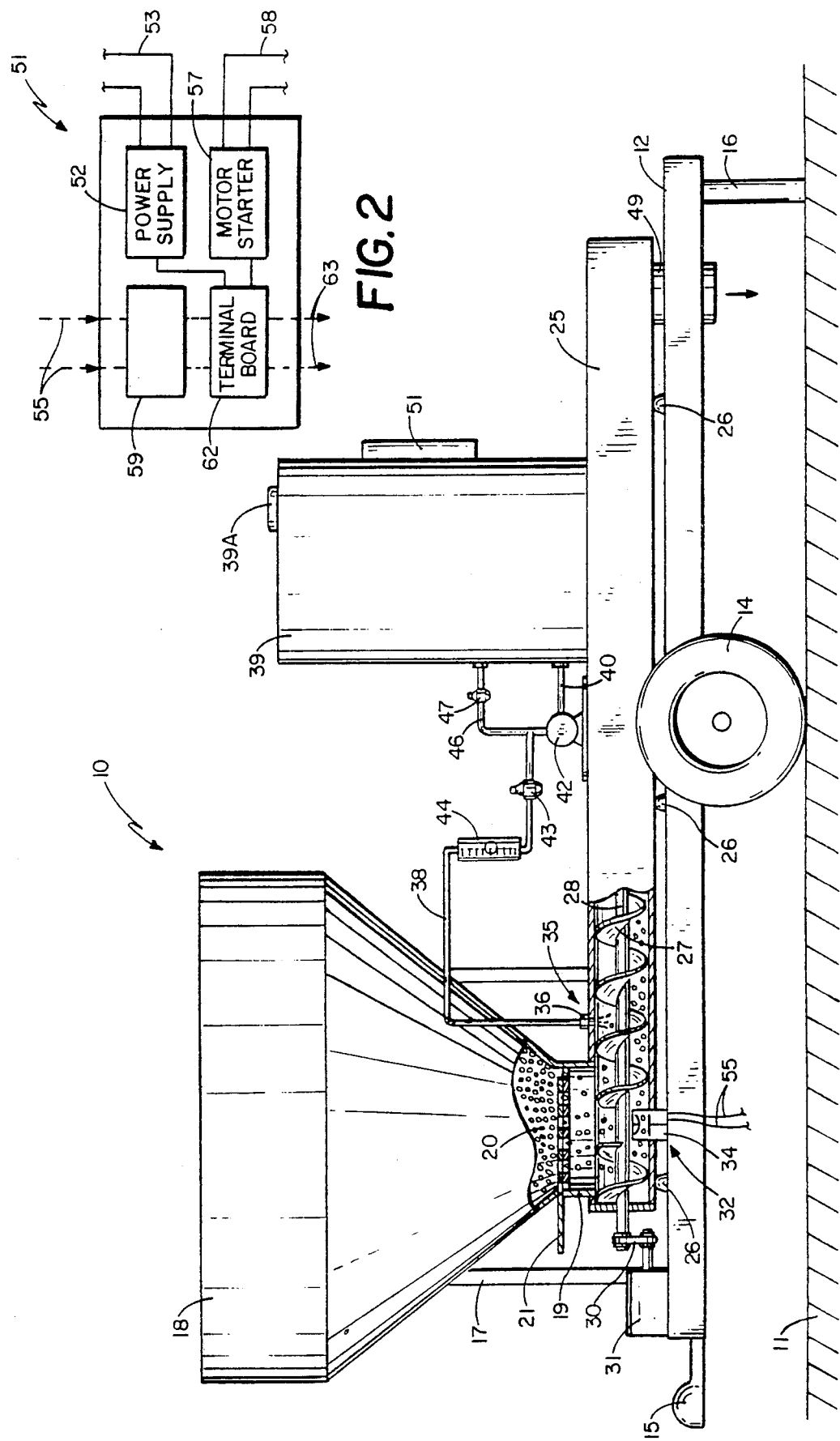

SEED GRAIN CONDITIONING APPARATUS

CROSS REFERENCE TO RELATED APPLICATION

This application is a continuation-in-part of U.S. Application Ser. No. 191,378 filed May 9, 1988 U.S. Pat. No. 4,898,092 entitled Feed Grain Conditioning Apparatus.

BACKGROUND OF THE INVENTION

Seed grain requires moisture for germination. According to usual agricultural practice, when row crops are planted, the seed is typically placed in the top one-half to two inches of soil. Before the seed can germinate, it must absorb sufficient moisture for germination from the surrounding top soil, a process that requires at least several days. If the top soil is particularly dry, this process occurs at an even slower rate or, at times, not at all. Within any given field the soil moisture conditions can range from very wet to quite dry. These variations at planting greatly affect the rate of germination of the seed and consequently the maturity and yield at harvest. Also during the germination period the seed is more susceptible to mold, and the seed bed to erosion from wind and water. In those climates where the growing season is already short, or when extreme weather conditions shorten the usual growing season, these added days can be a critical factor in the quality of the harvest. Gardners for many years have planted seeds soaked in water overnight to increase the rate of germination. This has never been a practical process commercially due to problems encountered when handling wet grain in bulk. The individual kernels adhere to each other or "bridge" which inhibits the flow of the grain.

SUMMARY OF THE INVENTION

The invention relates to apparatus for applying moisture to seed grain prepatory to planting in order to accelerate germination of the seed and shorten the time span between planting and harvest. The apparatus automatically and precisely applies sufficient moisture to seed grain to bring it an optimal or target moisture content sufficient for germination. The apparatus includes a holding device such as a small bin or hopper where the seed grain is placed. Within several hours of the intended planting activity, a conveying means transfers the seed grain from the storage facility to a wetting station where moisture is applied. A continuous flow moisture sensor is located between the storage facility and the wetting station in the path of the passing feed grain. The moisture sensor continuously intercepts a sample of the passing grain and measures the moisture content of it. The moisture sensor provides an electronic signal to a control station. The control station and moisture sensor are calibrated according to the type of seed grain. The moisture content sensed by the moisture sensor is compared to a target moisture content level at the control station and control adjustments are made accordingly in order to regulate the amount of moisture added to the seed grain to bring it to the target moisture content. The amount of moisture added to the seed grain can be regulated a number of ways. The amount of moisturizing agent added to the seed grain can be increased, decreased, or maintained constant according to the difference between the moisture level sensed by the sensor and the target moisture level. Alternatively, the speed of the conveying means can be increased or decreased while the spray product flow is held constant. Alternatively, the rate of seed grain released from the storage facility to the conveying means can be increased, decreased or held constant. A combination of controls can be used, although any one is sufficient.

The addition of moisture to the seed grain can extend the effective growing season of the crop by as much as 10 days. In drier years, the conditioning of the seed grain might allow growth of the crop that would otherwise not occur. The accelerated germination of the seed grain results in a reduced exposure of the seed bed to erosion from wind or water. There is reduced evaporative moisture loss from the soil. There is a more uniform maturity of crop at harvest. The crop yield at harvest is increased. The accelerated germination results in a reduced opportunity for mold to develop and harm the seed which can reduce or eliminate the need for toxic fungicides to be applied to the seed.

The moisture applied to the seed grain can be water or preferably a mixture of water and a nutrient or water and a surfactant, or both. Moisture penetration of the grain is greatly enhanced by the presence of a surfactant.

IN THE DRAWINGS

FIG. 1 is a side elevational view of one form of a seed grain treating apparatus according to the invention shown in a portable configuration readily transportable from place to place and with portions cut away for purposes of illustration; and FIG. 2 is a schematic view of the control box of the seed grain conditioning apparatus of FIG. 1.

DESCRIPTION OF A PREFERRED EMBODIMENT

FIG. 1 shows a seed grain conditioning apparatus 10 according to one form of the invention comprised as a portable unit for movement over ground surface 11 and for that purpose including an elongate trailer frame 12 mounted for movement upon trailer wheels 14 when under tow at a forwardly mounted trailer hitch 15. When stationary, trailer frame 12 can be supported by suitable support legs 16. Alternatively, grain conditioning apparatus 10 could be mounted at a fixed installation.

A seed grain holder device is comprised as a hopper 18 having downwardly convergent side walls and an outlet mounted on top of a downspout 19. Legs 17 help support hopper 18 on trailer frame 12. Hopper 18 can hold, by way of example, 500 pounds of seed grain 20. Means are provided for regulating the discharge rate of seed grain from hopper 18 to the discharge downspout 19. A slide gate 21 is installed between the outlet of the hopper 18 and the inlet of downspout 19. Slide gate 21 includes a fixed plate and a moveable plate mounted on top of the fixed plate. Each plate has a plurality of apertures. The movable plate is movable between positions of covering and uncovering relationship to the apertures of the fixed plate. The movable plate is movable to intermediate positions between the closed and open positions to regulate the amount of seed grain moving from the hopper 18 through the downspout 19.

Seed grain conveying means includes an auger assembly having an elongate auger housing 25 mounted on trailer frame 12 by housing supports 26. An elongate auger flight 27 is rotatably mounted in auger housing 25 on an auger shaft 28. An end of auger shaft 28 extends axially outward of housing 25 and is connected by drive transmission 30 to the output shaft of a variable speed electric motor 31.

Downspout 19 is mounted on one end or the upstream end of auger housing 25 and is open to auger housing 25 for discharge of seed grain from hopper 18. Seed grain 20 discharged from hopper 18 through downspout 19 enters auger housing 25 and is moved in a downstream direction by the rotating auger flight 27 upon operation of electric motor 31. By way of example, the auger assembly can move up to fifty pounds of seed grain per minute.

Seed grain 20 introduced into the end of auger housing 25 will be of varying moisture content. The object of apparatus 10 is to bring the moisture content of the seed grain up to an approximate target moisture content considered optimal to promote early germination of the seed grain once it is planted. Apparatus 10 continuously monitors the moisture content of grain introduced to the grain conveying means and employs this measurement to make adjustment as may be necessary in the rate of moisture application to the seed grain to bring it to the desired moisture content. The addition of too little moisture results in not totally accomplishing the desired objective of early germination or that of a uniform growth of crop upon harvest time. Since the moisture applied to the seed grain can also contain a surfactant or nutrient solutions, the addition of too much moisture is wasteful. Too much moisture will soften the seed excessively, making it difficult to handle and very susceptible to damage by mechanized planting.

A moisture sensing station 32 is located in operative proximity to the auger assembly to intercept a sample of passing seed grain for the purpose of measuring the moisture content of it. Moisture sensing station 32 includes a moisture sensor 34 mounted with respect to auger housing 25 and extending a short distance into the interior thereof positioned so that a portion of grain being moved by the auger flight 27 passes through the moisture sensor 34. A section of the auger flight 27 is removed at the sensing station 32 in order to provide clearance for the moisture sensor 34. Sensing station 32 is located at or near the discharge of hopper 18. It could alternatively be located in downspout 19 or in hopper 18. The moisture sensor 34 can be of any suitable conventional variety. For example, moisture sensor 34 can be of the capacitance type having a plate positioned generally parallel to the flow of grain such that a sample of feed grain passes over it. The capacitance will vary according to the moisture content of the passing seed grain. By passing seed grain samples of known moisture content through the sensor, the electronic output is calibrated for a particular type of seed grain. The electronic signal generated can be either in terms of a voltage or amperage. The higher moisture content of the seed grain, the greater the signal generated. A typical calibration could be a voltage output of between zero and four volts over the typical range of moisture content between eight and twenty percent.

A wetting station 35 is located downstream of sensing station 32 in operative proximity to the auger assembly. A spray applicator or nozzle 36 is installed in the wall of auger housing 25 at wetting station 35. Applicator 36 directs moisture preferably in spray form to the interior of auger housing 25 at wetting station 35 in order to apply moisture to passing seed grain. Applicator 36 derives wetting agent through a liquid line 38.

A liquid reservoir or tank 39 is mounted on frame 12 and contains a supply of liquid for application to the seed grain. Liquid contained therin can be water, or a mixture of water and a surfactant or a nutrient or both. An outlet line 40 extends from a lower portion of the liquid tank 39 to a fluid pump 42. The outlet of the fluid pump 42 is connected to one end of the liquid line 38 and also to a return line 46. An automatic valve 43 is located in liquid line 38. A solenoid valve or return valve 47 is connected in the return line 46 which returns again to the interior of the supply tank 39. The purpose of return line 46 is to provide a mixing function for the ingredients in the tank 39. Valve 43 can be totally closed and return valve 47 open whereby mixture is pumped by pump 42 from the outlet 40 through return line 46 to agitate and mix liquid in the tank 39 as is commonly done in certain agricultural applications. Under normal working conditions when seed grain is being processed, the return valve 47 will be closed and fluid will be pumped through the adjustable valve 43.

Valve 43 is adjustable with respect to the flow rate of fluid passing through it. A flow meter 44 is installed in the fluid line 38 downstream of the adjustable valve 43. Flow meter 44 indicates the flow rate of liquid pumped through the adjustable valve 43. The flow meter used to measure the liquid flow is a rotameter type. However any flow meter suitable for measuring water flow may be used successfully. This could include magnetic flow meters, paddlewheel or turbine flow meters, or one yet to be invented. The rotameter type is inexpensive and rugged enough to withstand jostling when the unit is moved. In a large scale commercial process, a magnetic flow meter could be used, since it generates an electronic signal usable to record water use or to notify the operator of a malfunction.

Downstream of the wetting station 35 is a mixing area for the mixing of the moisturizing agent and the seed grain. In the configuration shown, the mixing area comprises simply an extension or span of the auger housing 25 whereby the action of the auger flight in moving the feed grain toward the downstream end of the auger housing 25 is effective to mix the wetting agent with the seed grain. A discharge chute 49 is located at the end of auger housing 25 for discharge of treated seed grain prepatory to planting.

The application rate of wetting agent or moisture to the seed grain is precisely and continuously regulated according the measured moisture content of the seed grain as discharged from the hopper. The application rate can be controlled by alternative means. The speed of motor 31 can be modulated, holding constant the moisture discharge rate at the nozzle 36 and the seed grain discharge rate through the downspout 19. Variation of the speed of the motor 31 varies the speed of rotation of auger flight 27 and the rate of seed grain passing under the nozzle 36. The speed of motor 31 can be controlled according to the electronic output signal of the moisture sensor 34. As a second means, the application rate wetting agent provided through the nozzle 36 can be varied according to the measured moisture content of the seed grain. This can be modulated through the automatic valve 43 responsive to signals generated by the moisture sensor 34. As a third means, the amount of seed grain discharged through the slide gate 21 can be modulated according to the sensed moisture content of the seed grain at sensing station 32. An increase of discharge of seed grain through the downspout 19 will result in a lower moisture application rate.

A decrease will result in an increased application of moisture to the seed grain passing through the wetting station 35. Slide gate 21 as shown in FIG. 1 is operable manually, but could be operated as well by a suitable motor.

A control station or panel 51 is located on trailer frame 12 and, as shown, can be mounted on liquid reservoir tank 39. Control station 51 is shown schematically in FIG. 2. It includes a signal converter terminal 59, a power supply 52, a motor starter 57 and a terminal board 62. The electronic output of moisture sensor 34 is carried by main signal lines 55 to the signal converter terminal 59. The signal converter terminal 59 converts the voltage signal to an amperage signal measurable in milliamps for control of a control variable to regulate the rate of moisture addition to the seed grain. The voltage signal generated by the moisture sensor electronics could be used as a direct control signal. It is converted from the DC volt signal to a DC amperage signal because milliamp controllers are more readily available and slightly less expensive. This control could be comprised as, for example, modulation of the speed of auger motor 31, modulation of the valve opening of automatic valve 43, or control of a motorized open and shut mechanism for slide gate 21. The output from the signal converter terminal 59 is directed to terminal board 62 and then through output line 63 to the control mechanism. The signal converter terminal 59 is calibrated with the moisture sensor 34 according to a type of seed grain, for example, seed corn. The calibration is made with respect to a single control variable. For example, the output of terminal board 62 can extend to the control of variable speed motor 31 controlling the speed of auger flight 27. With slide gate 21 open at a constant setting and automatic valve 43 at a constant setting, calibration of signal converter 59 is conducted for seed corn. Seed corn at various known moisture contents, including the target moisture content, is passed through the moisture sensor 34 and the electronic output signal is recorded. A second calibration is made to calibrate the auger speed required to raise the moisture content of the seed grain to a target moisture content. The resultant calibration, that of any needed adjustment of rate of moisture application to the seed grain to bring it to the target moisture content, as controlled by the auger speed, is programed in the signal converter terminal. Alternatively, the calibration could be had with respect to varying the slide gate opening or the automatic valve opening or even a combination of control variables although any one is sufficient. Calibrations can be made with respect to different types of seed grain. A multiple of signal converter terminals can be provided at the control station as shown in parent patent application Ser. No. 191,378 filed May 9, 1988 now U.S. Pat. No. 4,898,092.

In use, the liquid mixture is introduced to the tank 39 through a suitable air vented cap 39A. If the mixture includes ingredients other than water, such as a nutrient, surfactant or steroid, in solid or liquid form, the circulating loop can be used to mix the ingredients. Automatic valve 43 is closed and return valve 47 is opened. Pump 42 is operated to circulate the mixture through the outlet 40 and back through the circulating line 46 for a suitable period of time to assure mixing.

A supply of untreated seed grain is placed in the hopper 18. Return valve 47 is closed and automatic valve 43 is opened. Power supply 52 provides power to the moisture sensor 34 through the power lines 53, and to other electrical components located at control station 51. Slide gate 21 is opened a predetermined amount. Auger motor 31 moves seed grain through the auger housing 25 by means of the auger flight 27. A sample of a seed grain continuously passes through moisture sensing station 32 where the moisture content is measured by the moisture sensor 34. The electronic signal generated by the moisture sensor is carried by the main signal lines 55 to the control station 51. The signal converter terminal 59 converts the voltage signal to an amperage signal which passes through terminal board 62 through signal control line 63. Signal control line 63 extends to a variable control, for example, a variable speed control on the auger motor 31. Power to the pump 40, the valve 43 and auger motor 31 can be controlled by motor starter 57 through power lines 58 deriving signals from the terminal board 62. The speed of the motor 31 is regulating according to the moisture content sensed by the moisture sensor 34. The speed of motor 31 is modulated according to the electronic signal generated by the moisture sensor 34 and converted at the signal converter terminal 59. The treatment mixture is pumped out of the chemical tank 39 by pump 42 through the spray nozzle 36 at the wetting station 35. The rate of application of moisture to the seed grain is controlled by the electronic signal generated by the moisture sensor. The flow rate can be monitored through observation of the flow meter 44. Downstream of the wetting station 35 the moisture and seed grain are thoroughly mixed in the auger housing 25. The treated seed grain is discharged through the discharge chute 49 for transfer to a means of conveyance for planting. The treated seed grain has acquired sufficient moisture for germination resulting in the more rapid development of an effective root system. This can shorten the effective growing season of the crop by as much as 10 days. In a particularly dry year, the rapid penetration of the subsoil by the root system can allow growth of the plant that would otherwise not occur. The rapid emergence of the plant reduces exposure of the seed bed to erosion from wind or water, results in reduced evaporative moisture loss from the soil, a more uniform stand of crop, and more uniform maturity at harvest. The yield at harvest is greater. For example, with respect to corn, the rows of kernels are longer resulting in greater yield per acre. There is a reduced opportunity for mold to develop and harm the seed, thus reducing or actually eliminating the need for application of toxic fungicides.

While there has been shown and described a particular embodiment of the invention, it is apparent that other forms can be practiced without departing from the scope of the invention. The physical conformation of the apparatus may be mobile, mounted on either a trailer as shown, a skid, or attached to another piece of movable equipment, such as a truck. Alternatively, it may be stationary, set on a concrete pad or other mounting structure. The materials of construction are critical only if a highly corosive ingredient is included in the treatment mixture. Then the construction materials are chosen to withstand that particular ingredient.

The embodiments of the invention in which an exclusive property or privilege is claimed are defined as follows:

1. A seed grain conditioning apparatus to prepare seed grain for planting through the addition of moisture to raise the moisture content of the seed grain to an approximate target moisture content to promote germination of the planted seed grain, comprising:

a frame;

a seed grain hopper mounted on the frame for holding a supply of seed grain prepatory to addition of moisture;

a supply of seed grain located in the hopper;

seed grain conveying means on the frame for moving seed grain from the hopper in a downstream direction to a discharge location;

an outlet from the hopper to the grain conveying means;

a sensing station and a wetting station on the grain conveying means between the hopper outlet and the discharge location, the wetting station being located downstream of the sensing station;

a moisture sensor of the type to substantially continuously monitor moisture content of passing seed grain and convert the measurement into an electronic signal, positioned at the sensing station located to intercept a sample of passing seed grain for substantially continuous measurement of the moisture content of the sample and translation of the measurement into an electronic signal;

liquid applicator means located at the wetting station positioned to disburse liquid derived from a liquid supply upon passing seed grain;

a liquid supply container mounted on the frame and containing a supply of liquid comprised as water and a surfactant type solution;

control means to regulate the rate of moisture addition to the seed grain, and means connecting the moisture sensor to the control means so that the control means operates responsive to the electric signal generated by the moisture sensor according to the difference between the moisture content of the seed grain sample as sensed by the moisture sensor and the target moisture content, said means including calibrated means connected between the moisture sensor and the control means for regulation of the control means by the signal from the moisture sensor calibrated according to a known moisture content of the type of seed grain to be conditioned.

2. The seed grain conditioning apparatus of claim 1 wherein: said control means includes means for regulating the rate of discharge of seed grain from the hopper to the conveying means.

3. The seed grain conditioning apparatus of claim 2 wherein: said means regulating the rate of discharge of seed grain from the hopper comprised as a slide gate moveable to intermediate positions between an open position and a closed position.

4. The seed grain conditioning apparatus of claim 1 wherein: said control means includes means for regulating the speed of the conveyor means.

5. The seed grain conditioning apparatus of claim 4 wherein: said conveyor means includes an auger housing and an auger installed in the auger housing, a variable speed motor connected to the auger, means regulating the speed of the conveyor means comprised as variable speed control means connected to the auger motor to regulate the speed of the auger motor according to the moisture content of seed grain measured by the moisture sensor.

6. The seed grain conditioning apparatus of claim 5 including: wheels mounting the frame for portability.

7. The seed grain conditioning apparatus of claim 6 wherein: said moisture sensor is comprised as a capacitance type moisture sensor extending into the auger housing positioned to intercept a sample of seed grain being moved by the auger, said auger having a segment of auger flight removed to provide clearance for the moisture sensor.

8. The seed grain conditioning apparatus of claim 1 wherein: said control means includes means regulating the volumetric flow rate of moisture applied to passing seed grain through the liquid applicator means.

9. The seed grain conditioning apparatus of claim 8 including: an automatic valve installed in said liquid line, means for regulating the volumetric flow rate of moisture applied to the passing seed grain at the liquid applicator means comprised as valve control means connected to the automatic valve control to regulate volumetric flow of liquid through the valve according to the moisture content of seed grain measured by the moisture sensor.

10. The seed grain conditioning apparatus of claim 9 including: wheels mounting the frame for portability.

11. The seed grain conditioning apparatus of claim 10 wherein: said grain conveyor means includes an auger housing, an auger installed in the housing, and an electric motor to drive the auger.

12. The seed grain conditioning apparatus of claim 11 including: a slide gate mounted between the hopper and the auger housing moveable to intermediate positions between an open position and a closed position.

13. The seed grain conditioning apparatus of claim 12 including: a discharge chute at the downstream end of the auger housing for discharge of treated seed grain.

14. The seed grain conditioning apparatus of claim 13 including: a span of auger housing located between the wetting station and the discharge chute to provide a mixing area for the moisture and the seed grain.

15. A seed grain conditioning apparatus to condition seed grain prepatory to planting to bring the seed grain up to an approximate target moisture content in order to promote germination of the seed grain, comprising:

a hopper for holding a supply of seed grain;

an auger assembly including an auger housing and an auger installed in the auger housing for moving seed grain from an upstream end of the auger assembly toward a downstream and thereof;

said hopper having a hopper outlet located adjacent the auger housing and communicating with the interior thereof for transfer of seed grain from the hopper to the auger housing proximate an upstream end thereof;

an auger motor for driving the auger;

a moisture sensor located in the auger housing positioned to intercept the sample of passing seed grain and measure the moisture content thereof, said moisture sensor of the type to continuously monitor the moisture content of the seed grain and convert the measurement into an electronic signal;

a spray nozzle connected to the auger housing at a location downstream of the moisture sensor positioned to disburse liquid upon passing seed grain;

a liquid tank containing liquid to be applied to seed grain comprised as water and a surfactant type solution;

a liquid supply line connected between the spray nozzle and the liquid tank for providing liquid to the spray nozzle;

control means for regulating the rate of application of liquid to the seed grain, means connecting the moisture sensor to the control means so that the control means operates responsive to the electronic signal generated by the moisture sensor according to the difference between the moisture content of the seed grain sample as sensed by the moisture sensor and the target moisture content, said means including calibrated means connected between the moisture sensor and the control means for regulation of the control means by the signal from the moisture sensor calibrated according to a known moisture content of the type of seed grain to be conditioned.

16. The seed grain conditioning apparatus of claim 15 wherein: said control means includes means for regulating the rate of discharge of seed grain from the hopper to the auger housing comprised as a slide gate moveable to intermediate positions between an open position and a closed position.

17. The seed grain conditioning apparatus of claim 15 wherein: said control means includes means for regulating the speed of the auger motor according to the moisture content of seed grain measured by the moisture sensor.

18. The seed grain conditioning apparatus of claim 17 including: a frame, wheels mounting the frame for portability, said hopper mounted on the frame, said auger housing and auger mounted on the frame, said sensing station and wetting station mounted on the frame, said liquid tank mounted on the frame.

19. The seed grain conditioning apparatus of claim 18 wherein: said moisture sensor is comprised as a capacitance type moisture sensor extending into the auger housing positioned to intercept a sample of seed grain being moved by the auger, said auger having a segment of auger flight removed to provide clearance for the moisture sensor.

20. The seed grain conditioning apparatus of claim 15 wherein: said control means includes means regulating the volumetric flow rate of moisture applied to passing seed grain through the spray nozzle.

21. The seed grain conditioning apparatus of claim 20 including: an automatic valve installed in said liquid supply line, means for regulating the volumetric flow rate of moisture applied to the passing seed grain at the spray nozzle comprised as valve control means connected to the automatic valve control to regulate volumetric flow of liquid through the valve according to the moisture content of seed grain measured by the moisture sensor.

22. The seed grain conditioning apparatus of claim 21 including: a frame, wheels mounting the frame for portability, said hopper mounted on the frame, said auger housing and auger mounted on the frame, said moisture sensor and spray nozzle mounted on the frame, and said liquid tank mounted on the frame.

23. A seed grain conditioning apparatus to apply liquid to seed grain in controlled amount to raise the moisture content of the seed grain to promote germination, comprising:

holding means to hold a supply of seed grain preparatory to conditioning;

a wetting station, means at the wetting station for controlled application of liquid to seed grain;

a mixing station, means at the mixing station for mixing seed grain and applied liquid; and conveying means extending from the holding means to the wetting station and the mixing station for conveyance of seed grain from the holding means past the wetting station for application of liquid in controlled amount, then past the mixing station for mixing of the liquid and seed grain;

a sensing station, means at the sensing station for measuring the moisture content of seed grain, said sensing station located relative to the conveying means for movement of seed grain from the holding means past the sensing station before moving past the wetting station, and control means for regulating the rate of liquid application to seed grain on the conveying means according to the moisture content of seed grain measured at the sensing station.

* * * * *